(12) United States Patent
Takeuchi et al.

(10) Patent No.: US 8,920,050 B2
(45) Date of Patent: Dec. 30, 2014

(54) TERMINATION ASSEMBLY FOR ALIGNMENT OF OPTICAL FIBERS

(75) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 13/325,147

(22) Filed: Dec. 14, 2011

(65) Prior Publication Data

US 2013/0156387 A1    Jun. 20, 2013

(51) Int. Cl.
*G02B 6/255* (2006.01)

(52) U.S. Cl.
USPC .............................................. 385/99; 385/98

(58) Field of Classification Search
CPC ...................................................... G02B 6/2558
USPC ....................................................... 385/97–99
See application file for complete search history.

(56) References Cited

U.S. PATENT DOCUMENTS

| | | | | |
|---|---|---|---|---|
| 4,254,865 A | * | 3/1981 | Pacey et al. | 385/99 |
| 4,789,217 A | * | 12/1988 | Mitch | 385/98 |
| 4,900,118 A | * | 2/1990 | Yanagawa et al. | 385/24 |
| 5,005,942 A | * | 4/1991 | Barlow et al. | 385/135 |
| 6,116,793 A | * | 9/2000 | Finzel et al. | 385/99 |
| 6,621,951 B1 | * | 9/2003 | Zhao et al. | 385/30 |
| 2006/0067637 A1 | * | 3/2006 | Carpenter et al. | 385/136 |
| 2012/0328251 A1 | | 12/2012 | Takeuchi et al. | |
| 2013/0008594 A1 | | 1/2013 | Takeuchi et al. | |
| 2013/0022324 A1 | | 1/2013 | Takeuchi et al. | |

OTHER PUBLICATIONS

"S918A Temporary Fiber Aligner," <http://www.fitel.k2international.net/Fitel_S612_Fixture_files/S612%20Ribbon%20Forming%20Fixture.pdf>, dated Sep. 10, 2008.

* cited by examiner

*Primary Examiner* — Mark Robinson
*Assistant Examiner* — Zachary A Nemtzow
(74) *Attorney, Agent, or Firm* — Lerner, David, Littenberg, Krumholz & Mentlik, LLP

(57) ABSTRACT

An assembly and method for splicing optical fibers is provided. A termination assembly may include a housing having an engagement element for engagement with an engagement component of a fixture and a support or splicer joint between which a first optical fiber extends in a longitudinal direction. A locking mechanism or a splicer joint may be operable to be biased against the first optical fiber to maintain an end of the first optical fiber at the support or the splicer joint fixed in position and only in a predetermined alignment with an end of a second optical fiber fixedly supported by the support or the splicer joint, such that the end of the second optical fiber is fixed at a predetermined orientation and a predetermined position at the support associated with the predetermined alignment by engagement of the engagement element with the engagement component.

8 Claims, 14 Drawing Sheets

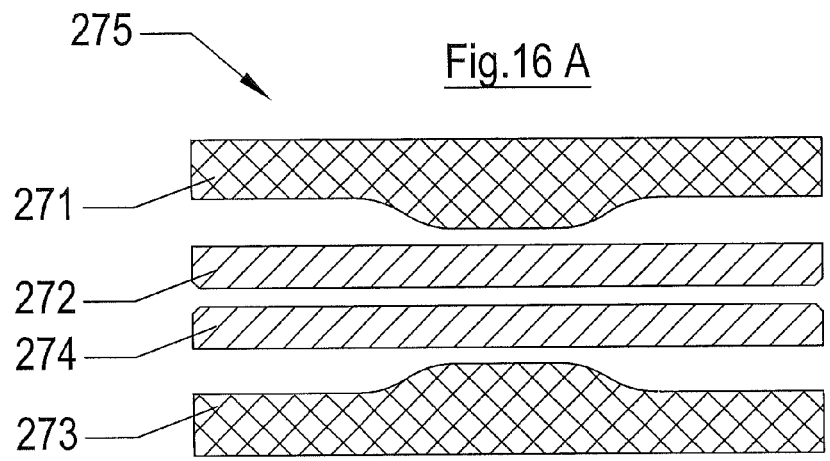
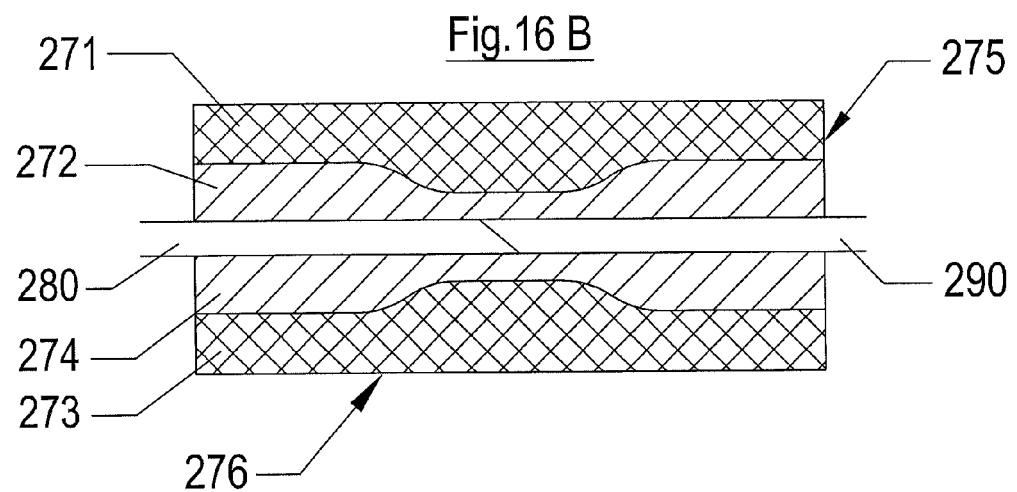

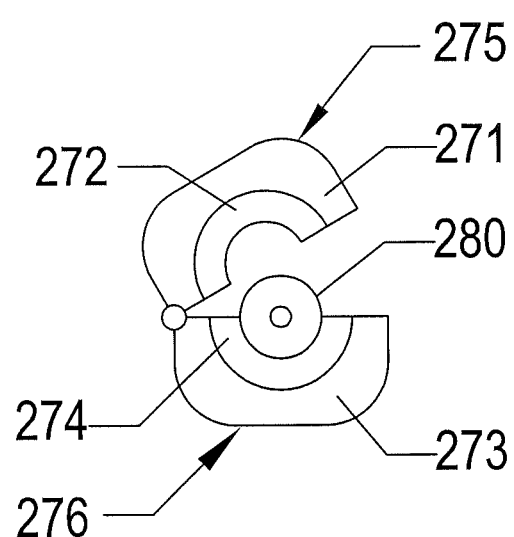

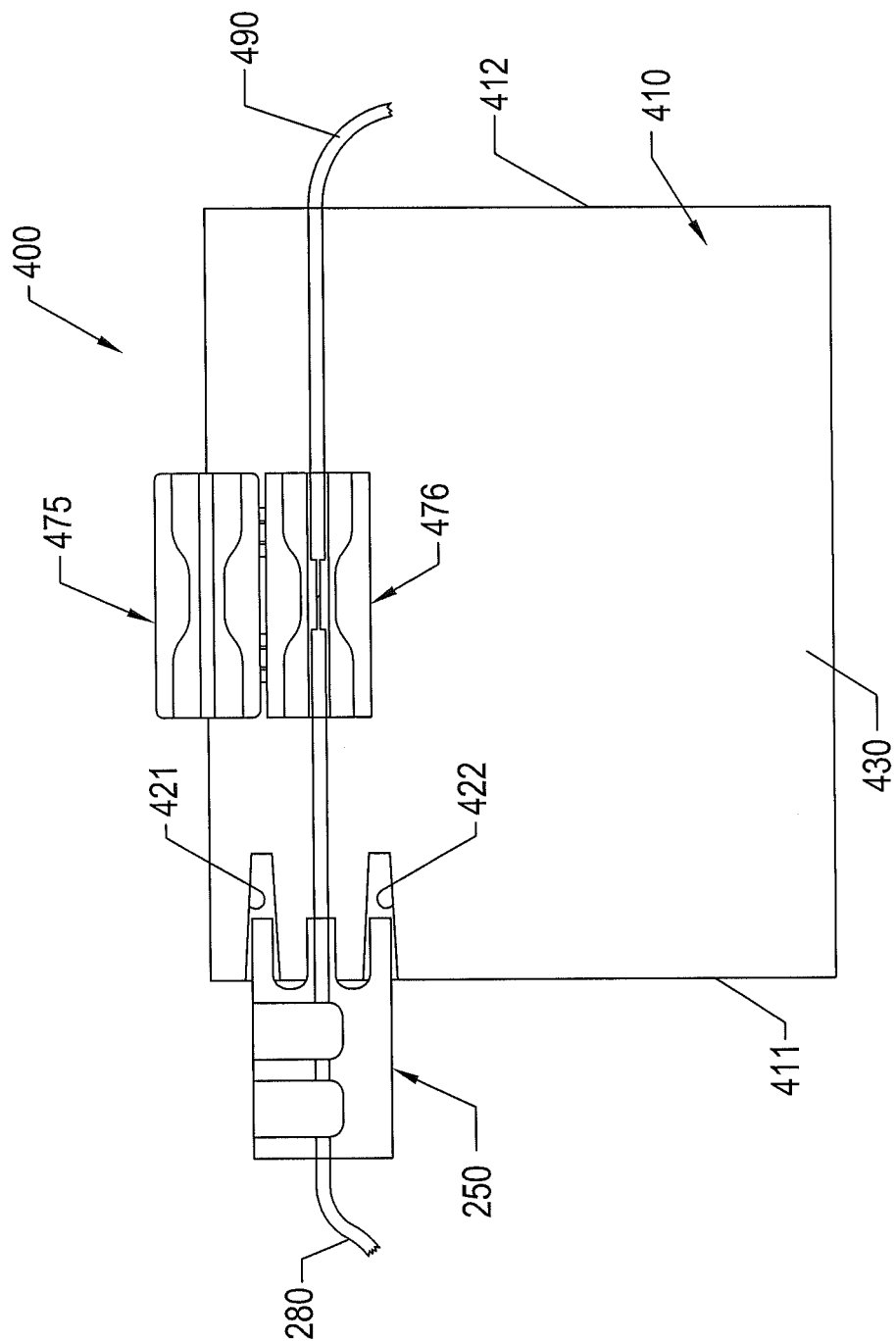

TERMINATION ASSEMBLY FOR ALIGNMENT OF OPTICAL FIBERS

CROSS-REFERENCE TO RELATED APPLICATIONS

The present application is related to U.S. patent application Ser. No. 13/167,928, filed on Jun. 24, 2011, U.S. patent application Ser. No. 13/176,829, filed on Jul. 6, 2011, and U.S. patent application Ser. No. 13/187,666 ("the '666 Appl."), filed on Jul. 21, 2011, the disclosures of which are incorporated herein by reference.

FIELD OF THE INVENTION

The present invention relates to the field of fiber optics and terminations for optical fibers, particularly optical fiber termination assemblies for the alignment of the ends of optical fibers.

BACKGROUND OF THE INVENTION

In the fiber optics communication industry, many companies have developed means by which optical fibers can be connected to one another. Splicers, in particular, come in two primary forms: fusion splicers and mechanical splicers. A fusion splicer physically fuses the ends of two optical fibers together by the application of heat, typically from an electrical arc. Fusion splicers are advantageous in that they create splices in which the insertion and return losses are precisely controlled. However, fusion splicing is complicated, expensive, and requires advanced technical equipment not readily suited for use in the field, particularly if local electric power required is not available.

A mechanical splicer is a junction of two fibers aligned with each other and held in place within a ferrule or similar assembly, such as a traditional v-groove alignment ferrule. The fibers are not physically joined as in a fusion splice. Rather, the fiber ends are held very close together within the ferrule aligned with each other, optionally with an optical index matching gel in between, so that light can pass from one end to the other end in a desired path and with the least amount of disturbance. Because of its ease in application and simplicity in terms of labor, training and equipment cost, mechanical splicing is preferred for use in the field, especially when electrical power is hard to reach, and the terminations and splicing points are scattered around, not centralized, such as for installation in multi-dwelling-units.

In the past, the prior art has used v-groove alignment for most of the mechanical connectors as well as for mechanical splice-on connectors. In these configurations, the fibers to be connected are laid in the v-groove such that the fiber tip of one fiber abuts the tip of the second fiber. The fibers are aligned in the v-groove, and they are then locked in the groove by a hard pad or cover (the hardness is usually softer than the glass material itself) pressing into the v-groove. The hard pad and the v-groove form a triangle for securing the fibers.

However, this v-groove alignment may not be the best in the case of connecting two fibers. The v-groove is the same along its length with respect to the mechanical joint. One or both fibers to be mechanically connected will typically have a slightly varying diameter due to manufacturing variations. For example, a fiber out-diameter of a stripped end of a fiber is typically specified to have a diameter of 125 µm, but in reality there is always some variation or eccentricity around the circumference of the fiber. If two fibers are inserted from opposite ends of a v-groove, the variation in diameter will create an offset for the core (the center axis of about 0.8-0.9 µm in diameter) of the fibers. To be more specific, the axis of one fiber may be shifted with respect to the axis of the other fiber. The offset is part of the eccentricity. The eccentricity remains even after the fibers are locked in the v-groove. This tiny eccentricity, which may be only a few microns, will impact the insertion loss as well as the return loss of the junction between the two fibers. In addition, v-groove configured joints often do not apply an evenly-distributed force on the portions of the fibers contained within the groove. This can lead to misalignment of the fiber ends within the joint and can cause additional insertion and return losses.

It is, therefore, desirable to provide a configuration in joints of optical fiber ends that minimizes such an unperfected physical alignment and unwanted insertion and return losses.

SUMMARY OF THE INVENTION

In accordance with one aspect of the invention, an optical fiber termination assembly may include a housing having a first engagement element and a support adapted to support at least one optical fiber extending in a longitudinal direction. The optical fiber termination assembly may include at least one locking mechanism attached to the housing. The locking mechanism may be arranged to be operable to apply a bias towards the support such that, when an end of a second optical fiber is fixedly supported by the support extending in the longitudinal direction and an engagement component of a first fixture is engaged with the first engagement element of the assembly, a first optical fiber of the first fixture may extend longitudinally from the first fixture towards the support. In this manner, the locking mechanism may be operable to be biased against the first optical fiber to maintain an end of the first optical fiber at the support fixed in position and only in a predetermined alignment with the end of the second optical fiber. In this manner, the end of the first optical fiber may be at a predetermined orientation and a predetermined position at the support associated with the predetermined alignment by engagement of the first engagement element with the engagement component.

In accordance with another aspect of the invention, a fixture for mounting optical fibers may include a base for engaging a housing of an optical fiber termination assembly. The base may include a surface for supporting an optical fiber having an end. The fixture may include a clamping mechanism attached to the base such that, when the optical fiber is supported by the base, the clamping mechanism may be operable to be biased towards the base and against the optical fiber to maintain the optical fiber end fixed at a predetermined position at the base and a predetermined orientation with respect to the surface of the base. In this manner, when the base is engaged with the housing, the end of the optical fiber may be positioned at a predetermined position and in a second predetermined orientation within the termination assembly.

In accordance with another aspect of the invention, a method of mechanically splicing optical fibers may include a step of engaging an engagement component of a first fixture with a first engagement element of a housing in which the housing may be adapted to support at least one optical fiber. In this manner, a first optical fiber of the first fixture may extend longitudinally from the first fixture towards the support. The method may further include a step of maintaining an end of the first optical fiber at the support fixed in position and only in a predetermined alignment with an end of a second optical fiber fixedly supported at the support. In this manner, the end of the first optical fiber may be positioned at a predetermined orientation and a predetermined position at the support associated with the predetermined alignment by engagement of the first engagement element with the engagement component.

In accordance with another aspect of the invention, a method of mechanically splicing optical fibers may include a step of placing a second optical fiber on a support of a housing extending in a longitudinal direction in which the housing may be adapted to support at least one optical fiber extending in a longitudinal direction. The method may further include engaging an engagement component of a first fixture to a first engagement element of the housing in which the first fixture has a first optical fiber extending longitudinally from the first fixture towards the support. The method may further include maintaining an end of the first optical fiber at the support fixed in position and only in a predetermined alignment with an end of the second optical fiber. In this manner, the end of the first optical fiber is positioned at a predetermined orientation and a predetermined position at the support associated with the predetermined alignment by engagement of the engagement element with the engagement component.

BRIEF DESCRIPTION OF THE DRAWINGS

FIG. 16A is an exploded side cross-sectional view of rigid and deformable portions of the locking mechanism and a support of the termination assembly of FIG. 12.

FIG. 16B is a side cross-sectional view of the rigid and deformable portions of the locking mechanism and the support shown in FIG. 16A in a closed position.

FIG. 16C is a side cross-sectional view of the locking mechanism shown in an open position and the support of FIG. 16A with an optical fiber therebetween.

FIG. 17 is a plan view of a termination assembly of another embodiment of the invention.

DETAILED DESCRIPTION OF THE INVENTION

The present disclosure provides for a termination assembly for joining ends of respective optical fibers in a predetermined alignment and orientation to optimize the transmission of optical signals between the optical fibers. Such an assembly may include a housing capable of engagement with at least one fixture at a predetermined position of the housing. The fixture may have a clamping mechanism for positioning and orienting a first optical fiber on a surface of the fixture. The first optical fiber may extend from the fixture and be supported by a support of the housing that may additionally support a second optical fiber extending longitudinally from the support. A locking mechanism or splicer joint assembly, such as described in the '666 Appl. and further herein, may fixedly secure and join the first and second optical fibers.

Figure 1:
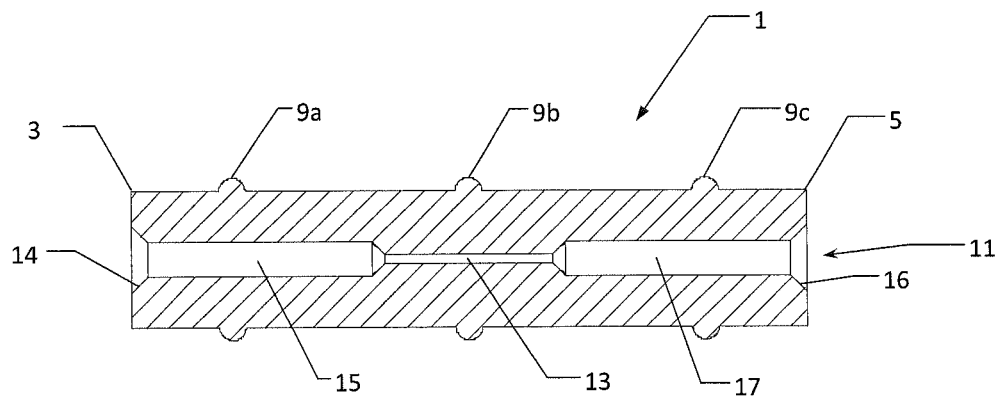
FIG. 1 is a cross-sectional view of a splicer joint according to a first embodiment of the invention.
Figure 2:
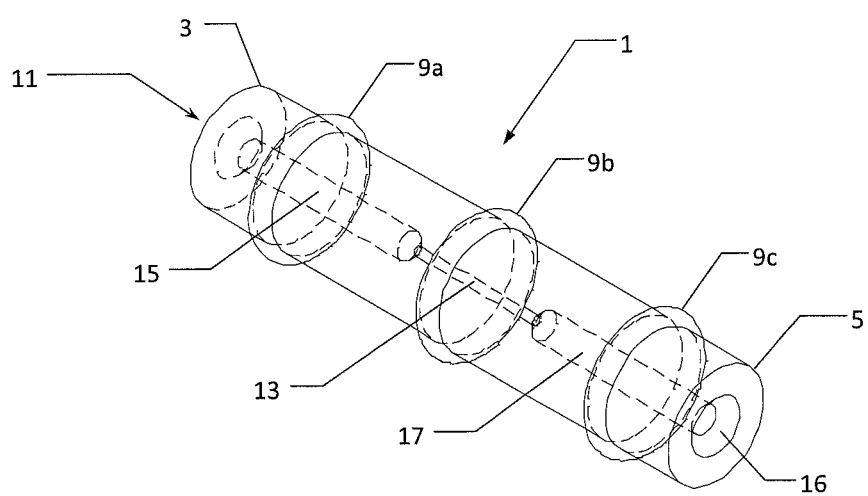
FIG. 2 is an isometric view of the splicer joint shown in FIG. 1.
Figure 3:
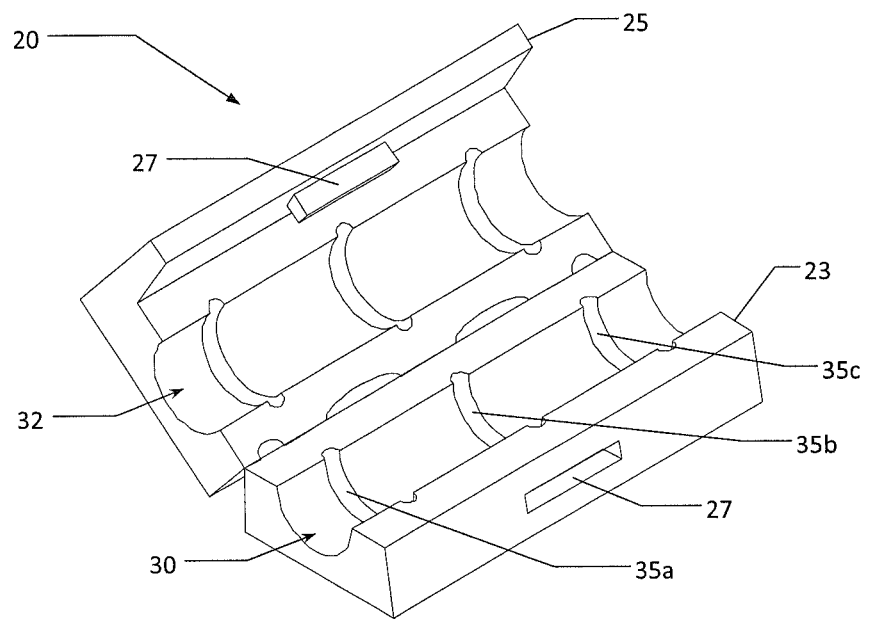
FIG. 3 is an isometric view of the locking assembly according to the first embodiment of the invention.

FIGS. 1-3 show a first embodiment of a splicer joint locking assembly for mechanically splicing together first and second optical fibers (not shown). Each fiber to be locked in the joint has a coated portion (such as a 900 µm coating), and a stripped end with no coating (such as a bare fiber which is 125 µm in diameter) terminating at a fiber tip.

FIG. 1 shows a cross-sectional view of the splicer joint. FIG. 2 shows an isometric view of the splicer joint. The splicer joint 1 is made from a slightly deformable plastic material and has a left end 3 and a right end 5. The exterior of the splicer joint is cylindrical in shape extending from the left end 3 to the right end 5. (See FIG. 2.)

An axial bore 11 extends from the left end 3 to the right end 5. The axial bore 11 has a middle portion 13 between the left end 3 and right end 5. The diameter of the axial bore in the middle portion 13 is slightly less than the diameter of the stripped ends of the fibers. The axial bore in the middle portion 13 is expandable and will expand slightly when the stripped end of a fiber is pushed into the bore. Preferably, the diameter of the axial bore in the middle portion 13 is about 0.5-10 µm less than the diameter of the stripped end, which is typically about 125 µm in diameter. The axial bore also preferably comprises a left portion 15 between the left end 3 and the middle portion 13, and a right portion 17 between the right end 5 and middle portion 13. The diameter of the axial bore in the left and right portions 15 and 17 is slightly greater, preferably about 20 µm greater, than the diameter of the coated portion (typically 250-900 µm) of the fibers. The axial bore 11 of the splicer joint preferably has a tapered section 14 at the left end 3 and a tapered section 16 at the right end 5. The tapered sections 14 and 16 serve as a guide for guiding the first and second fibers into the axial bore.

The exterior of the splicer joint 1 has a plurality of raised ridges 9a, 9b and 9c extending circumferentially around the cylindrical exterior surface. The raised ridges comprise a left ridge 9a, a middle ridge 9b, and a right ridge 9c extending circumferentially around the cylindrical exterior in the area of left portion 15, middle portion 13, and right portion 17 of the axial bore, respectively.

The splicer joint 1 receives the first fiber in the axial bore 11 from the left end 3 and the second fiber in the axial bore 11 from the right end 5. The stripped end of each fiber is frictionally received within the middle portion 13 of the axial bore 11 (as that bore expands slightly) and the fiber tip of the first fiber is aligned with and abuts the fiber tip of the second fiber in the middle portion 13. A conventional index matching gel may be inserted into the middle portion 13 to provide for better light transmission between the two fiber tips. The left portion 15 of the axial bore 11 receives a coated portion of the first fiber. Similarly, the right portion 17 of the axial bore 11 receives a coated portion of the second fiber.

FIG. 3 shows a locking case 20 for receiving the splicer joint described in FIGS. 1 and 2. Locking case 20 comprises: a base 23; a lid 25 that closes over the base; and a locking mechanism 27 for locking the lid 25 to the base 23. The base 23 and lid 25 have interior etched portions 30 and 32, respectively. When the lid 25 is closed over and locked to the base 23, the interior etched portions 30 and 32 form a cylindrical surface with circumferential grooves 35a, 35b and 35c. This grooved cylindrical surface is complementary to the cylindrical exterior surface on the splicer joint 1, with the exception that a dimension (such as the diameter) of each circumferential groove 35a, 35b and 35c is slightly less than the dimension of the corresponding ridge 9a, 9b and 9c, respectively, on the splicer joint 1.

When the splicer joint 1 containing the first and second fibers is placed in the locking case 20 and the lid 25 is closed over and locked to the base 23, the circumferential grooves 35a, 35b and 35c exert an inward radially symmetric force on left, middle and right ridges 9a, 9b and 9c, respectively, of the splicer joint, thereby causing the ridges to deform. The ridges 9a, 9b and 9c consequently exert a force on the first and second fibers within the left, middle and right portions of the axial bore, respectively. This force locks the first and second fibers at the same time within the splicer joint 1. The surface tension that the middle portion 13 of the axial bore provides against the stripped ends of the fibers, and the radially symmetric nature of the clamping force by the splicer joint and locking assembly, cause the first and second fibers to be locked in the joint without altering the alignment of the fiber tips in the middle portion 13 of the axial bore. This action minimizes insertion and return losses that would otherwise occur. The locking case 20 may be removed from the splicer joint 1 or left locked on the splicer joint 1.

In operating the assembly, the first fiber is inserted into the axial bore 11 of the splicer joint 1 from the left end 3 and the second fiber is inserted into the axial bore 11 from the right end 5 until the stripped end of each fiber is frictionally received within the middle portion 13 of the axial bore 11, and the fiber tip of the first fiber is aligned with and abuts the fiber tip of the second fiber in the middle portion 13. An index matching gel (not shown) may also be inserted into the middle portion 13 to promote better transmission between the fiber tips of the first and second fibers.

The splicer joint is then placed within the locking case 20, by laying the splicer joint 1 within the etched portion 30 in the base 23 such that a portion of ridges 9a, 9b and 9c fall into grooves 35a, 35b and 35c, respectively, in the base 23. Thereafter, the lid 25 is closed over the base 23 and the locking mechanism 27 is engaged to lock the lid 25 to the base 23. As mentioned above, when the lid 25 is locked to the base 23, the circumferential grooves 35a, 35b and 35c exert a force on the corresponding ridges 9a, 9b and 9c. This force causes the ridges 9a, 9b and 9c to deform and consequently exert a force on the first and second fibers, locking the fibers within the splicer joint 1. The forces exerted are radially symmetric due to the circular nature of the construction. The radially symmetric forces lock the fibers together without altering the alignment between the fiber tips of the first and second fibers in the middle portion 13. This preserved alignment minimizes insertion and return losses during transmission.

Figure 4:
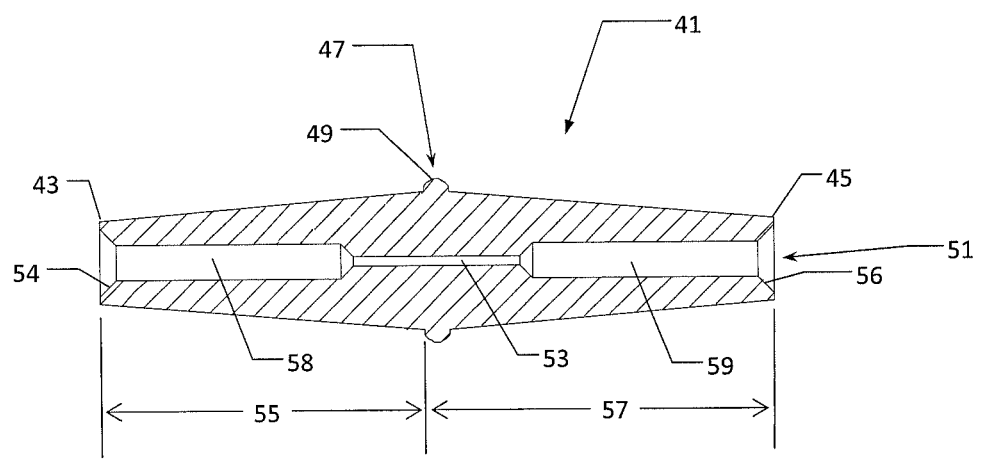
FIG. 4 is a cross-sectional view of a splicer joint according to a second embodiment of the invention.
Figure 5:
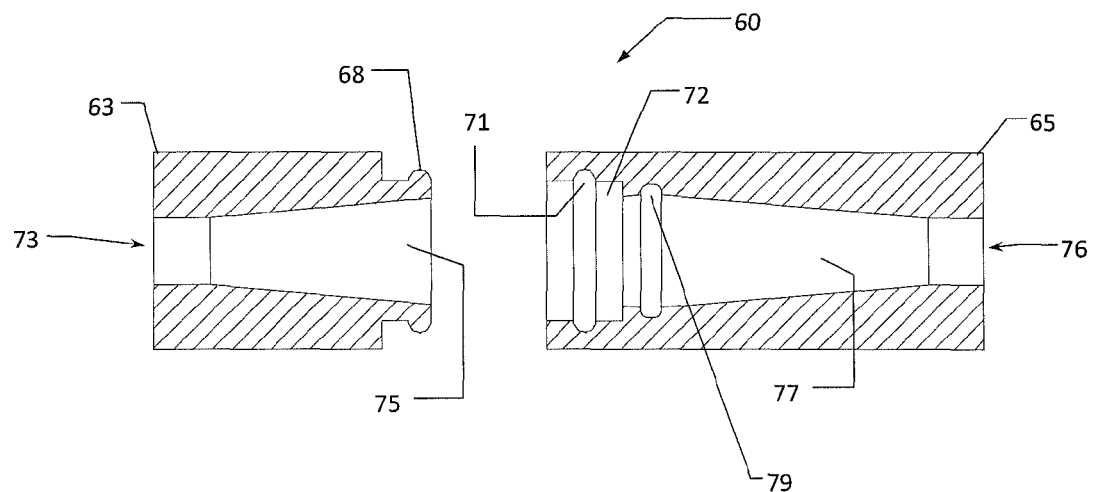
FIG. 5 is an cross sectional view of a locking assembly according to the second embodiment of the invention.

FIGS. 4 and 5 show another embodiment of the invention. Referring to FIG. 4, the splicer joint 41 comprises: a left end 43, a right end 45, and a mid-point 47 between the left end 43 and right end 45. The splicer joint 41 is made of a slightly deformable plastic material and has a variable diameter cylindrical exterior surface with equal cylindrical diameters at the left and right ends 43 and 45, and a maximum cylindrical diameter at the mid-point 47. The exterior surface has a raised ridge 49 extending circumferentially around the cylindrical exterior surface at the mid-point 47. The exterior of the splicer joint 41 is further defined by a left portion 55 between the left end 43 up to about the mid-point 47 and a right portion 57 between the right end 45 up to and including the mid-point 47.

The splicer joint 41 has an axial bore 51 extending from the left end 43 to the right end 45. The axial bore 51 has a middle portion 53 running through the area of the mid-point 47. The axial bore 51 in the middle portion 53 has a diameter that is slightly less (about 0.5-10 μm) than the diameter of the stripped end, which is typically about 125 μm. The axial bore 51 in the middle portion 53 is expandable and will expand slightly when a stripped end of each fiber is pushed into the bore. The axial bore 51 includes a left bore portion 58 between the left end 43 and the middle portion 53, and a right bore portion 59 between the right end 45 and the middle portion 53. The diameter of the axial bore in the left and right bore portions 58 and 59 is slightly greater than the diameter of the coated portion on the optical fiber, for example, 900 μm for the coated portion of the fiber. The axial bore of the splicer joint may also have tapered sections 54 and 56 at the left and right ends 43 and 45, respectively, for guiding the first and second fibers into the axial bore, respectively.

FIG. 5 shows a locking case 60 for receiving the splicer joint 41. The locking case 60 comprises: a left section 63; a right section 65; and a snap-fit locking mechanism for locking the left section 63 to the right section 65 when the sections are pushed toward one another. The snap-fit locking mechanism includes a circular lip 68 extending around a peripheral portion on one end of the left section 63 and a lip-receiving circular groove 71 on one end of the right section 65. When the ends of the left section 63 and right section 65 are pushed toward one another, the circular lip 68 snap-fits into the circular lip-receiving groove 71 and locks the left section 63 to the right section 65. A small annular gap 72 is provided in the right section 65 to provide a tolerance that allows the snap-fit locking assembly to work smoothly given that the dimensions of the parts may not be exact.

The left section 63 of the locking case has an internal bore 73 for receiving the first fiber. The internal bore 73 includes a tapered bore section 75 forming a surface that is complementary to the exterior of the left portion 55 of the splicer joint 41. The right section 65 similarly has an internal bore 76 for receiving the second fiber. The internal bore 76 in the right section includes a tapered internal bore section 77 and a circumferential internal groove 79 forming a surface that is complementary to the right portion 57 (which includes the raised ridge 49) of the splicer joint 41. When the left section 63 and right section 65 are locked together, the tapered internal bore sections 75 and 77 form an internal surface that is complementary to the exterior surface of the splicer joint. However, the internal surface of the locking case 60 at least in the area of the circumferential internal groove 79 corresponding to the raised ridge 49 has a dimension (such as the diameter) that is slightly less than the dimension of the raised ridge 49.

When the left section 63 is pushed toward and locked to the right section 65 over a splicer joint 41 carrying first and second fibers, the circumferential internal groove 79 of the right section 65 exerts a force on the raised ridge 49 of the splicer joint 41. The force causes the splicer joint 41 to deform and locks the first and second fibers within the splicer joint. This locking force, combined with the surface tension on the stripped ends of the fibers by the middle portion 53 of the splicer joint, minimizes any misalignment between the fiber tips and consequently reduces insertion and return losses during optical transmissions.

The tapered bore section 75 of the left section 63 may optionally have a dimension (such as the diameter) that is less than the corresponding dimension on the left portion 55 of the splicer joint. Similarly, the tapered bore section 77 of the right section 65 may optionally have a dimension (such as the diameter) that is less than the corresponding dimension on the right portion 57 of the splicer joint. With such a structure, when the splicer joint 41 carrying first and second fibers is placed in the locking case and the left section 63 is pushed toward and locked to the right section 65, the tapered internal bore 75 exerts a force on the left portion 55 of the splicer joint 41, and the tapered internal bore 77 exerts a force on the right portion 57 (in addition to exerting a force on the ridge 49). The additional forces exerted by the tapered bores 75 and 77 cause the splicer joint to deform slightly and exert a force on additional portions of the fibers at the same time in the splicer joint 41.

The embodiment shown in FIGS. 4 and 5 is used as follows. The user first threads the first fiber through the internal bore 73 (and tapered bore section 75) in the left section 63 of the locking case 60. The first fiber is then inserted into the axial bore 51 of the splicer joint 41 from the left end 43 such that the coated portion of the fiber is received in the left portion 58 of the axial bore 51 and the stripped end is frictionally received within the middle portion 53, which expands to received the stripped end. The same process is carried out for the second fiber but using right section 65 of the locking assembly and the right side 45 of the splicer joint 41. Once finished, the stripped end of each fiber is frictionally received within the middle portion 53 of the axial bore from opposite sides and the fiber tip of the first fiber is aligned with and abuts the fiber tip of the second fiber in the middle portion 53. An index matching gel inserted into the middle portion 43 will help improve the insertion loss and return loss of the mechanical splice.

Thereafter, the left section 63 and right section 65 of the locking case 60 are pushed toward one another to engage the snap-fit locking mechanism and lock the sections to one another. As described above, the locking of sections 63 and 65 causes the internal tapered bore sections 75 and 77 to exert a force on the splicer joint 41 at least at the point of the raised ridge 49. The exerted force(s) lock the first and second fibers within the splicer joint.

Figure 6:
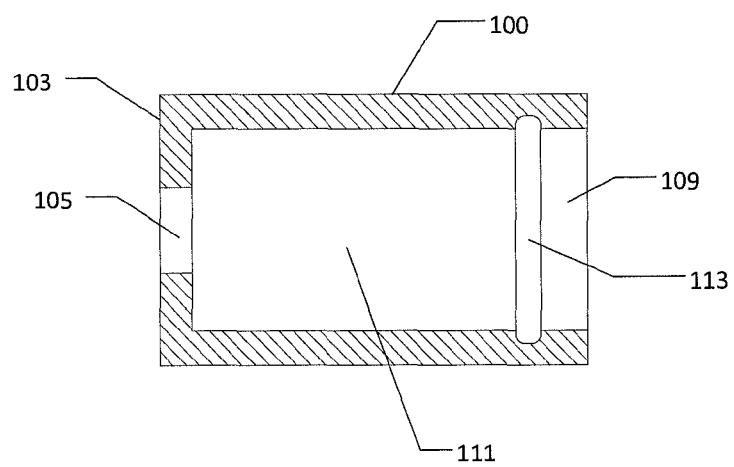
FIG. 6 is a cross-sectional view of a housing according to a third embodiment of the invention.

FIGS. 6-11 show an additional embodiment of the invention. This embodiment provides a radially symmetric snap-fit assembly for mechanically locking a field optical fiber within a radially symmetric ferrule of a splice-on connector (such as UPC or APC). The field fiber has a coated portion and a stripped end terminating at a tip. As shown in FIG. 6, the assembly comprises a connector housing 100 having a first end 103 with an opening 105 and a second open end 109. The second open end 109 includes a cylindrical bore 111 extending up to first end 103. The cylindrical bore 111 further includes an internally oriented circumferential groove 113.

Figure 7:
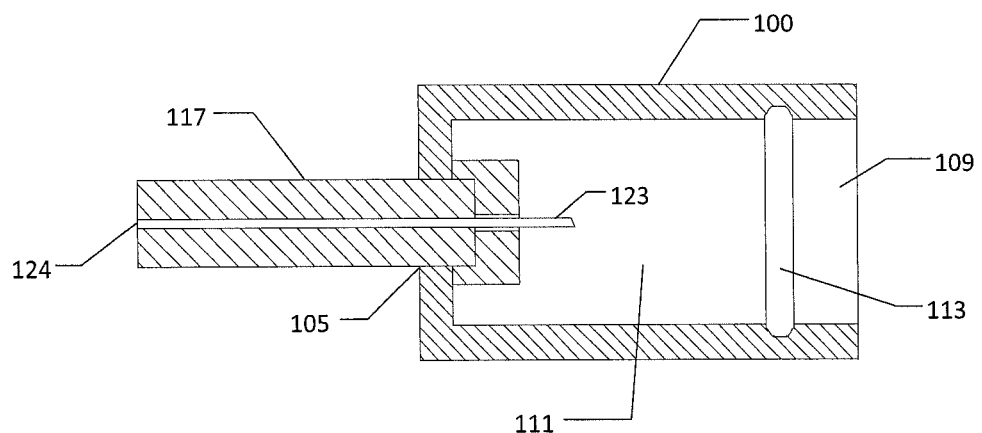
FIG. 7 is a cross-sectional view of the housing and ferrule/base subunit according to the third embodiment of the invention.
Figure 8:
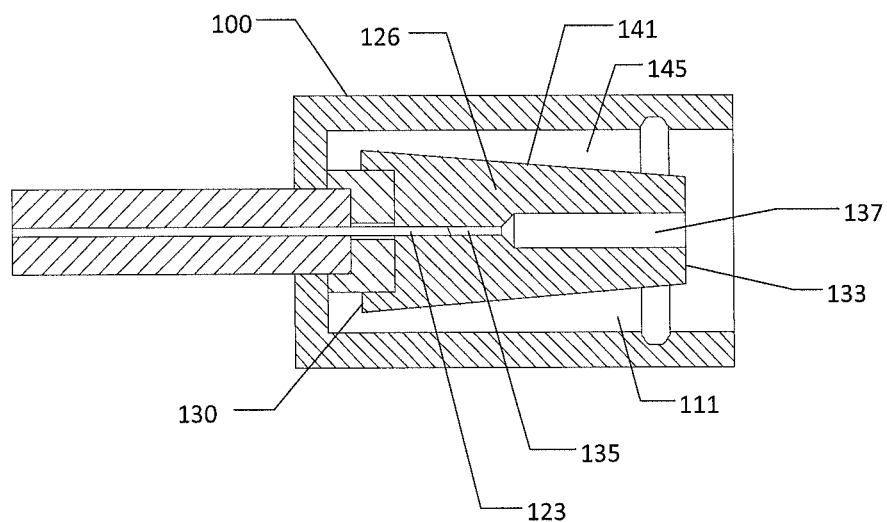
FIG. 8 is a cross-sectional view of the housing, ferrule/base subunit, and locking ferrule according to the third embodiment of the invention.

Referring to FIG. 7, a ferrule/base subunit 117 is disposed in the opening 105 on the housing 100. The subunit 117 contains a cleaved fiber stub 123 (such as an angle-cleaved stub for APC connectors or a flat cleaved fiber stub for UPC connectors) extending from the subunit into the cylindrical bore 111 of the housing. The fiber stub 123 also extends to the outer end 124 of the subunit 117 where it is cut and polished in the factory. Now referring to FIG. 8, a locking ferrule 126 formed from a slightly deformable plastic is disposed within the cylindrical bore 111 of the housing 100. The locking ferrule has a first end 130 attached to the subunit 117, and a second end 133 disposed within the second open end of the housing. The locking ferrule 126 contains a first axial bore 135 which has a diameter slightly less than the diameter of the fiber stub 123 and of the stripped end of the field optical fiber (not shown). A portion of the first axial bore 135 expands slightly and frictionally receives the fiber stub 123 extending from the subunit 117. The remaining portion of the axial bore 135 will also expand slightly for frictionally receiving the stripped end of the field fiber (not shown). The locking ferrule 126 also has a second axial bore 137 coaxial with the first axial bore. The second axial bore 137 has a diameter slightly greater than the coated portion of the field fiber. The second axial bore 137 is for receiving the coated portion of the field fiber (not shown). Finally, the locking ferrule has a tapered cylindrical exterior surface 141 with a maximum outer diameter which is less than the diameter of the cylindrical bore 111 of the housing. The difference in diameters results in an annular gap 145 between the cylindrical bore 111 of the housing 100 and the exterior surface of the locking ferrule 126.

Figure 9:
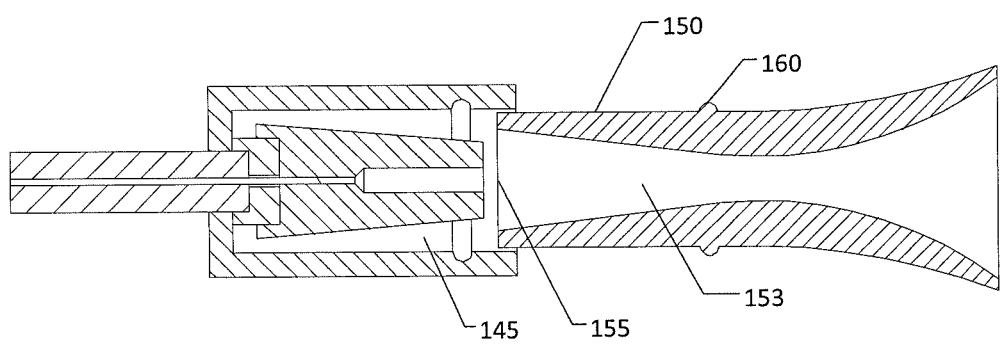
FIG. 9 is a cross-sectional view of the housing, ferrule/base subunit, locking ferrule, and locking boot prior to engagement in the annular groove between the housing and the locking ferrule according to the third embodiment of the invention.
Figure 10:
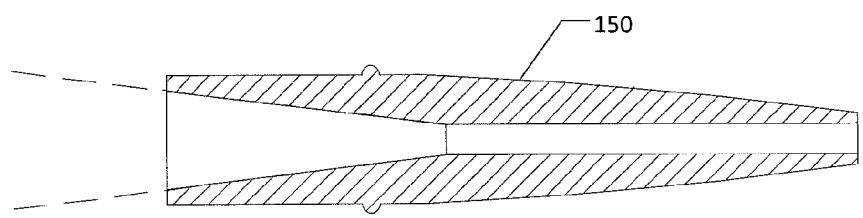
FIG. 10 is a cross-sectional view of an alternate locking boot according to the third embodiment of the invention.

Referring to FIG. 9, the assembly also includes a cylindrical cone shaped locking boot 150 having an internal axial bore 153 for receiving the field fiber and for engaging the locking ferrule 126. The locking boot 150 includes a first boot end 155 having a diameter and wall thickness that permit the first boot end 155 to be inserted into the annular gap 145. The locking boot 150 has a variable diameter and variable wall thickness along the longitude of the locking boot. The interior wall of the locking boot 150 also has a slight v-cone shape wherein the wall thickness of the locking boot 150 is greater than the thickness of the annular gap 145. FIG. 10 shows an alternate construction for the locking boot 150 in which the v-cone shape is emphasized in dotted lines.

Figure 11:
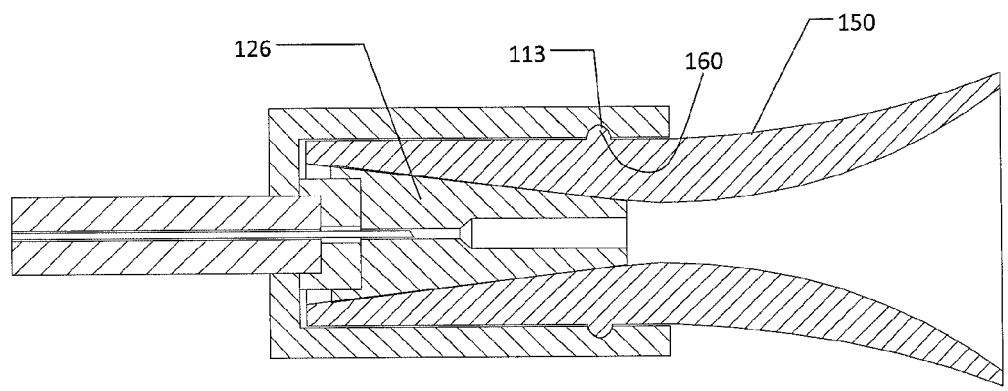
FIG. 11 is a cross-sectional view of the housing, ferrule/base subunit, locking ferrule, and locking boot engaged in the annular groove between the housing and the locking ferrule according to the third embodiment of the invention.

Referring to FIG. 11, as the locking boot 150 is pushed into the annular gap 145, the variable diameter and variable wall thickness of the locking boot 150 cause the locking boot 150 to exert an inward radially symmetric force on the locking ferrule 126. The force deforms the locking ferrule 126 and exerts a force on the field fiber contained within the locking ferrule 126 to lock the field fiber within the locking ferrule 126. The locking boot 150 also includes a raised ridge 160 extending circumferentially around the exterior. The raised ridge 160 snap-fit locks within the internally oriented circumferential groove 113 in the cylindrical bore 111 of the housing 100 when the locking boot 150 is pushed a certain amount into the annular gap 145. This action locks the locking boot 150 to the housing 100. The radially symmetric force of the locking boot 150 on the locking ferrule 126, and the surface tension that the axial bore 135 provides on both the fiber stub 123 and on the stripped end of the optical fiber provide for an excellent alignment of the fiber stub and field fiber, which alignment minimizes insertion and return losses.

Figure 12:
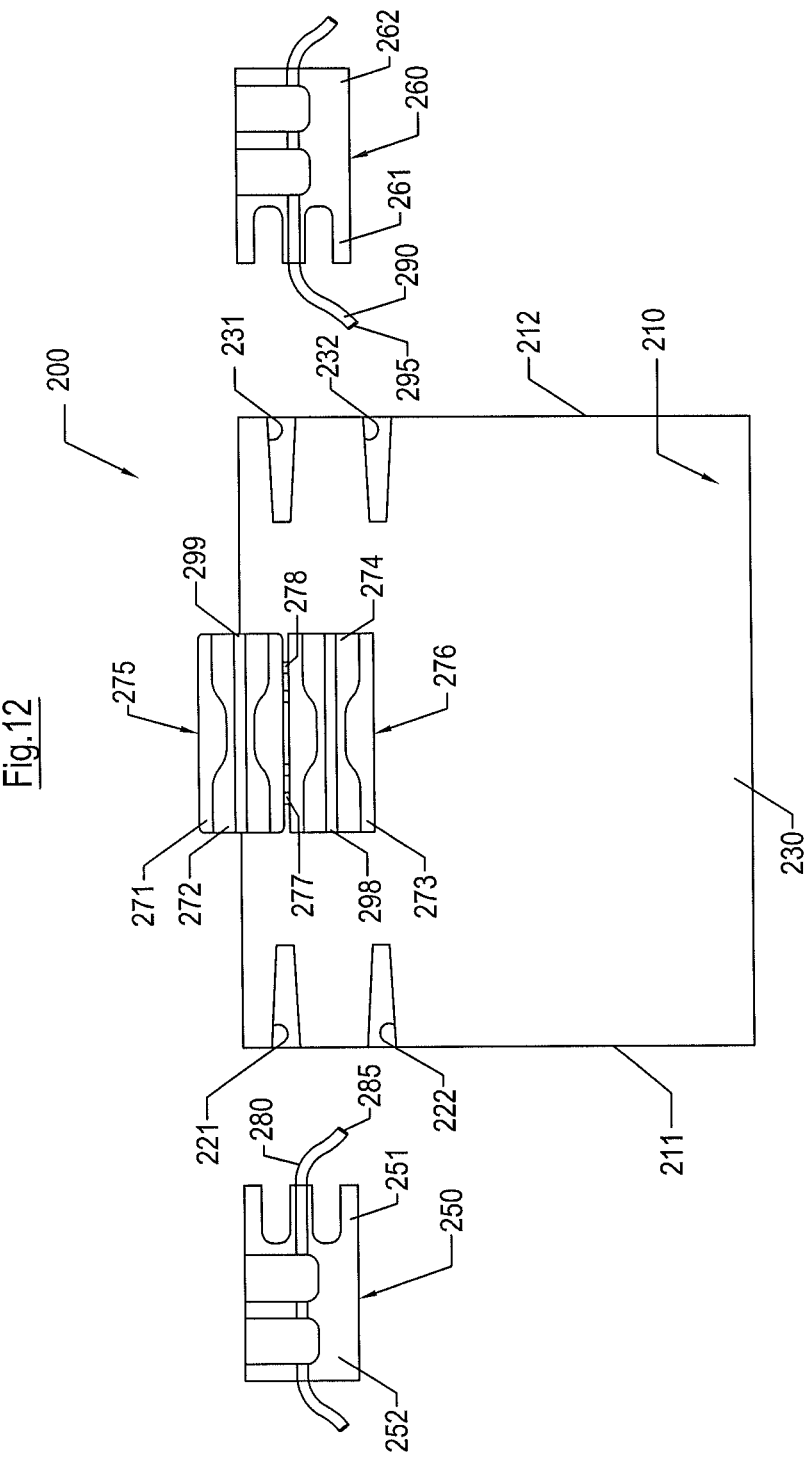
FIG. 12 is a plan view of a termination assembly of an embodiment of the invention, shown with a locking mechanism in an open position and fixtures disengaged from engagement elements of the assembly.
Figure 13:
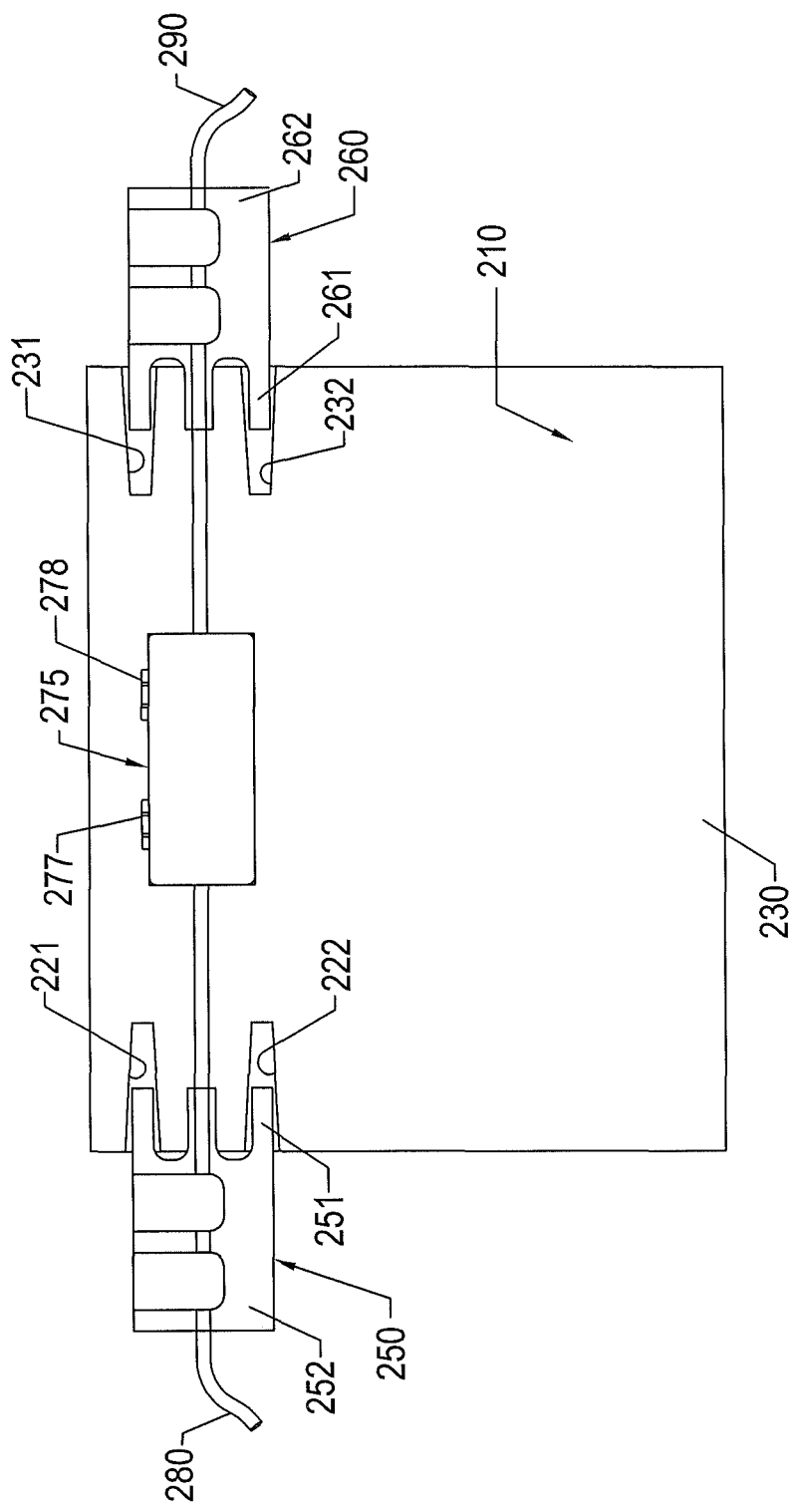
FIG. 13 is a plan view of the termination assembly of FIG. 12, shown with the locking mechanism in a closed position and the fixtures engaged with the engagement elements of the assembly.

Referring now to FIGS. 12-13, in a further aspect of the invention, a termination assembly 200 may include a housing 210 having two opposing ends 211, 212. At or near each of the respective ends 211, 212 may be engagement elements 221, 222 and 231, 232 respectively. The housing may have curved or linear sides or a combination of each. The housing may have a square, rectangular, oval, or other profile. The housing may be capable of attachment to a cover (not shown) that may have a similar profile as that of the housing. In some embodiments, the cover may be curved in which, in some instances, it may have a somewhat hemispherical or dome shape over a inner surface of the housing, such as an inner surface 230 of the housing 210.

Each of the engagement elements 221, 222 and 231, 232 may be capable of engaging respective first and second engagement components of fixtures adapted for such engagement. The engagement elements of FIGS. 12-13 are slots that taper toward the center of the termination assembly 200 from the ends 211, 212. In other embodiments employing slots as engagement elements, the slots may not taper such that opposing sides of the slots are substantially perpendicular to the end from which the slots extend. Furthermore, alternative engagement elements may be tracks capable of engaging rails of fixtures or may be flexible flanges that extend across a slot and that are capable of snapping corresponding flexible flanges of fixtures into them.

As shown in FIGS. 12 and 13, the first and second fixtures 250, 260 may, on surfaces thereof, support first and second optical fibers 280, 290 having ends 285, 295, respectively. As shown in FIG. 13, first portions 251, 261 of the first and second fixtures 250, 260 opposite second portions 252, 262 may be removably inserted into the engagement elements 221, 222 and 231, 232 respectively.

Figure 14:
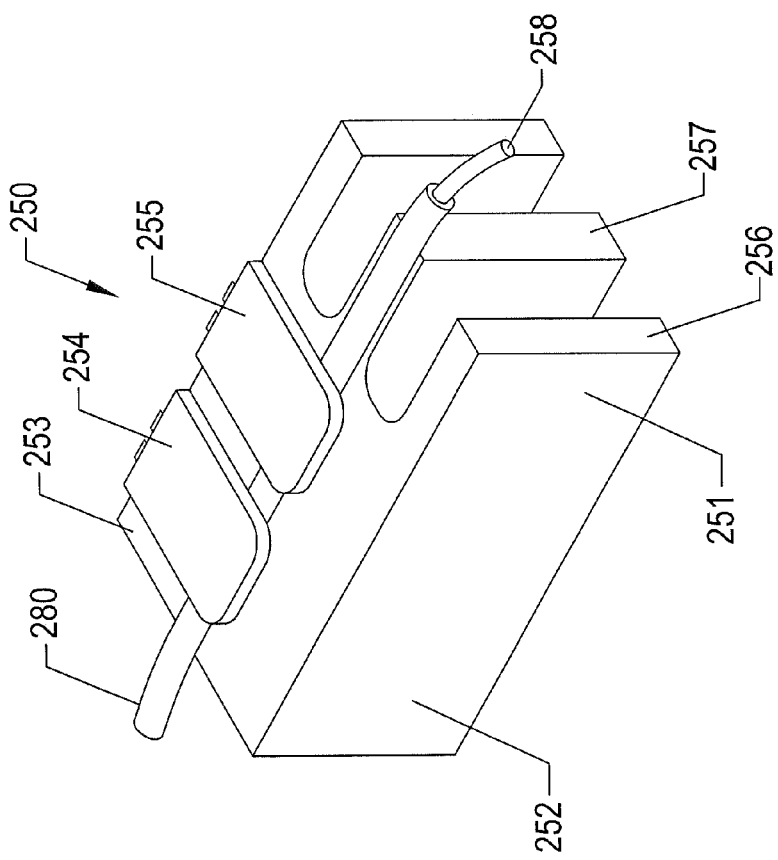
FIG. 14 is a perspective view of a fixture in accordance with an embodiment of the invention.

As shown in the expanded view of FIG. 14, the first portion 251 of the fixture 250 may have at least two outer prongs 256, 258 on opposite sides of a middle prong 257. In some embodiments, the first portion 251 may have no central prong or may only have a central prong. Although the prongs in FIG. 14 do not have a taper, in alternative embodiments, the prongs may have a taper along a length of the prongs in the longitudinal direction of the fixture 250. In an embodiment, the prongs 256-258 may be inserted into the engagement elements 221, 222 of the termination assembly 200. In such an embodiment, the outer prongs 256, 258 may slide into the engagement elements 221, 222 until they contact the engagement elements 221, 222. Due to the taper, further insertion of the outer prongs 256, 258 will create an interference fit as a consequence of the friction between the outer prongs 256, 258 and the engagement elements 221, 222 at their points of contact.

In embodiments in which the engagement elements do not have a taper, the engagement elements and the outer prongs may be sized such that contact between the engagement elements and the outer prongs may create an interference fit at the points of contact immediately upon insertion of the outer prongs into the engagement elements. In still further embodiments, the fixture may have slots and the housing may have prongs in a reverse configuration from that just described.

Figure 15:
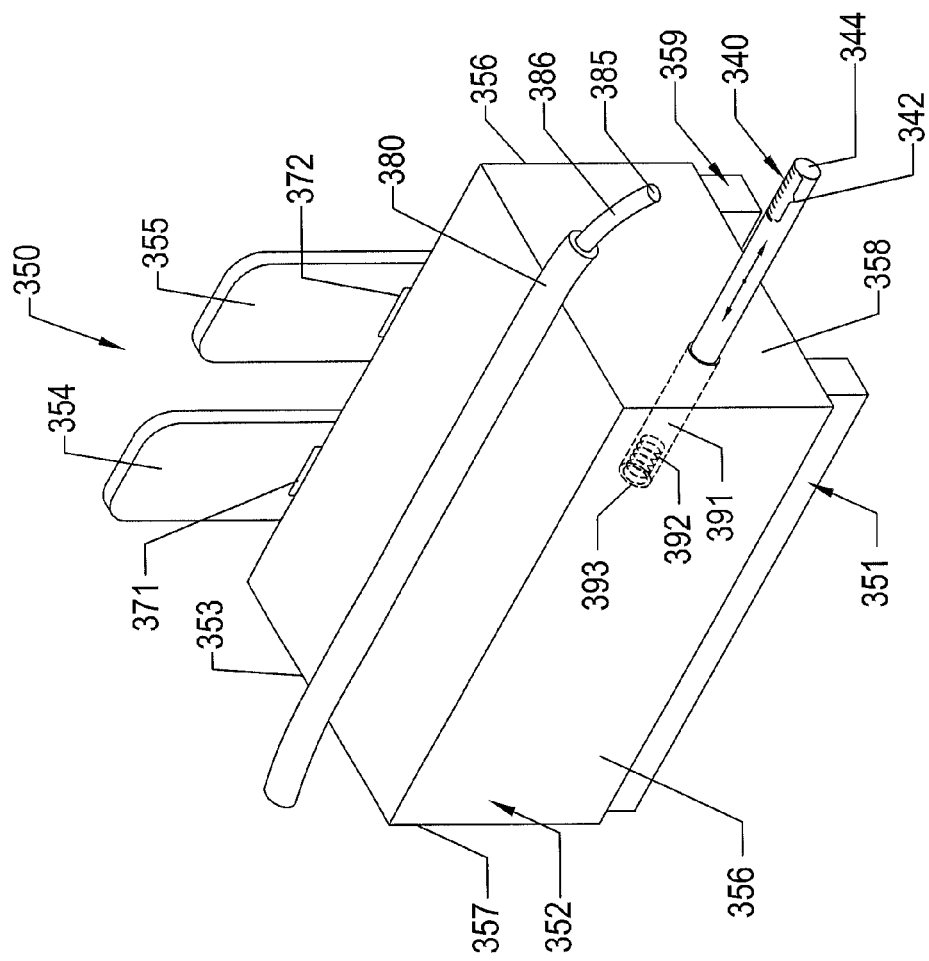
FIG. 15 is a perspective view of a fixture in accordance with another embodiment of the invention.

In another embodiment illustrated in FIG. 15, a fixture 350 may have rails 351, 359 attached to and extending from a base 352. The rails 351, 359 may extend along a length of the fixture 350. In such an embodiment, the rails 351, 359 may be spaced apart such that they are capable of engagement with corresponding tracks acting as engagement elements of a housing as described previously herein. In this manner, the rails 351, 359 may slide within the tracks. There may be very minimal clearance between the rails 351, 359 and the tracks such that contact points between the rails and the tracks form an interference fit and prevent movement of the fixture 350. In some embodiments, there may be fewer or greater than two rails.

Clamping mechanisms 354, 355 may be attached to the base 352 near an edge of a clamping surface 353 at hinges 371, 372, respectively, as shown in FIG. 15. In the figure, the clamping mechanisms 354, 355 are shown in an open position rotated away from the clamping surface 353. When an optical fiber, such as the optical fiber 380 is placed on the clamping surface 353, the clamping mechanisms 354, 355 may be rotated towards the clamping surface 353 to contact the optical fiber 380 such that its position and orientation including its rotation relative to the fixture 350 is maintained fixed. In some embodiments, the hinges 371, 372 may be springs that bias the clamping mechanisms 354, 355 against the clamping surface 353 and consequently cause contact with the optical fiber 380 to maintain the optical fiber 380 fixed in position. In some embodiments, the clamping mechanisms 354, 355 may snap into the clamping surface 353, but the snap may be located at a distance from the hinges 371, 372 relative to the clamping surface such that the optical fiber must be contacted before a snap portion of the clamping mechanisms, e.g. male portions of snaps, reach a snap portion of the clamping surface, e.g., female portions of snaps.

As further shown in the example of FIG. 15, a measurement guide 340 may extend from the base 352 in a direction parallel to the direction the optical fiber 380 extends when the optical fiber 380 is arranged in a desired manner on a clamping surface 353 of the fixture 350, such as extending parallel to opposing longitudinally extending parallel faces 356 of the fixture 350. The measurement guide 340 may have markings spaced equal distances apart for determining the length of select portions of the optical fiber, such as portions extending from the base 352 that correspond to a stripped section 386 of the fiber 380, when the optical fiber 380 is arranged in the desired manner as described above and a portion of the optical fiber 380 between an end 385 of the optical fiber 380 and an end 358 of the base 352 is taut. In some embodiments, the measurement guide 340 may be retractable such that an end 344 of the measurement guide 340 may be moved from a first distance away from the base to a second distance away from the base that is shorter than the first distance. In at least some embodiments, the measurement guide 340 may be a cylindrical tube for receipt into a corresponding cylindrical bore 391. In such embodiments, an elastic device, such as a spring 392, may be inserted into the bore 391 and may seat against a wall 393 such that retraction of the measurement guide 340 into the bore 391 causes the spring 392 to deflect and provide a restoring force against the measurement guide 340. Upon release of the measurement guide 340, the restoring force against the guide 340 causes the end 344 of the measurement guide 340 to return to its original position.

With the optical fiber fixed in position, the fixture 350 may be placed into tracks on the inner surface of the housing such that the optical fiber fixed in position on the fixture 350 is placed into a predetermined position at the housing. The rails of the fixture may be arranged around the perimeter of the fixture in any manner in which the rails may be slid into corresponding tracks of the housing. In this manner, the rails may be on the same or an opposite side as the optical fiber fixed into the fixture or even on opposing sides of the fixture.

Referring again to FIG. 14, when in a closed position, clamping mechanisms 254, 255 may maintain the first optical fiber 280 against a clamping surface 253 of the fixture 250 in a manner similar to the clamping of the fiber 380 in the fixture 350. It should be noted that each of the features described as to the fixture 250 may also pertain to the fixture 260. In this manner, the thickness of the fixture 260 may be the same as that of the fixture 250, and the position of the second optical fiber 290 may be substantially identical to the position of the first optical fiber 280. Thus, referring again to FIG. 13, the engagement elements 221, 222 and the first portion 251 and the engagement elements 231, 232 and the first portion 261 may be configured such that, upon their engagement, the ends 285, 295 of the first and second optical fibers 280, 290 are in a predetermined alignment and relative orientation including relative rotational angle of the ends 285, 295.

Referring again to FIGS. 12 and 13, when the fixtures 250, 260 are engaged with the housing 210, the ends 285, 295 of the optical fibers 280, 290 may be placed on and supported by a support 276 attached to the housing 210. In some embodiments, a locking mechanism 275 may be attached to and rotate about the support 276 through the use of hinges 277, 278 such that each of the optical fibers 280, 290 may be placed on the support 276 only when the locking mechanism 275 is in an open position as shown in FIG. 12. In other embodiments, fewer or greater than two hinges may be used.

In the example shown in FIG. 12 and FIGS. 16A and 16B, the locking mechanism 275 may include a rigid outer portion 271 and a deformable inner portion 272. Similarly, the support 276 may include a rigid outer portion 273 and a deformable inner portion 274. In such a configuration, a portion of each of the optical fibers 280, 290 may be placed into a groove 298 along a longitudinal centerline of the inner portion 274 of the support 276 such that their respective ends 285, 295 may come into contact or be in proximity with each other. In this manner, as shown in FIG. 13, each of the optical fibers 280, 290 may be supported by and extend longitudinally between their respective fixtures 250, 260 and the support 276. In some embodiments, an index matching gel may be placed between the ends 285, 295 of the fibers 280, 290.

As further shown in FIG. 13 and in more detail in FIG. 16B, the locking mechanism 275 may be closed onto the placed portions of the optical fibers 280, 290. In some embodiments, the locking mechanism 275 may be biased against the support 276. For example, the hinges 277, 278 may be coil springs that create this biasing effect. In some embodiments, a latch or lock may also be used that fixes the position of the locking mechanism relative to the support upon closure of the locking mechanism onto the support.

As shown in FIG. 12, the locking mechanism 275 may have a corresponding groove 299 that may envelop the remaining portions of the optical fibers 280, 290 not contacting the support 276 when the fibers 280, 290 are placed in the groove 298. Accordingly, as further shown in FIG. 16B, closure of the locking mechanism 275 onto the support 276 may compress the deformable portions 272, 274 of the respective locking mechanism 275 and support 276 due to the lack of clearance in the grooves 298, 299 caused by the placement of the optical fibers 280, 290 into the grooves 298, 299. Such compression may fix the facing ends of the optical fibers 280, 290 only in a predetermined alignment with each other along substantially the centers of the ends 285, 295 of these fibers 280, 290, where the ends of the optical fibers 280 and 290 are fixed, respectively, at predetermined orientations and predetermined positions at the support associated with the predetermined alignment. The predetermined orientations and predetermined positions of the respective ends of the fibers at the support associated with the predetermined alignment obtained from operation of the locking mechanism to fix the ends only in the predetermined alignment may be the same as, or differ slightly from, the predetermined orientations and predetermined positions of the respective ends of the fibers at the support prior to operation of the locking mechanism fixing the ends of the fibers only in the predetermined alignment. In this manner, the first and second optical fibers 280, 290 may be mechanically spliced together at these centers to enable transmission of an optical signal from one fiber to the other with a minimum of loss and disturbance.

As shown in FIG. 17, in some embodiments, a housing 410 as part of a termination assembly 400 may only have engagement elements 421, 422 on an end 411 opposite an end 412. The fixture 250 may then be engaged with the engagement elements 421, 422 in a similar manner to the engagement with the engagement elements 221, 222 described previously herein. The first optical fiber 280 may be supported by a support 476 as described for the support 276. In contrast to embodiments using two fixtures, an end of a second optical fiber 490 may be fixed in the support 476 at a predetermined orientation and a predetermined position prior to engagement of the fixture 250 with the housing 410. Upon placement of the first optical fiber 280 on the support 476, a locking mechanism 475 similar to the locking mechanism 275 may be operated to fix an end of the optical fiber 280 only in a predetermined alignment with the end of the optical fiber 490, where the end of the optical fiber 280 is fixed at a predetermined orientation and a predetermined position associated with the predetermined alignment, such that the first and second optical fibers 280, 490 may be spliced together as described previously herein.

It should be noted that in any of the embodiments utilizing a locking mechanism and support, these features may be replaced by any of the embodiments of the splicer joint described earlier. In still another embodiment, the splicer joint may be a tube having an inner diameter along the entire length sized to tightly hold the optical fiber therein and an outer diameter for attachment to the housing. In any of these embodiments, the optical fibers may extend longitudinally from the fixtures to the splicer joint.

In some embodiments, the housing may have a spooling mechanism around which the optical fiber can be wound. The spooling mechanism may be attached near a locking mechanism or a splicer joint, such as those described herein. In this manner, excess optical fiber may be kept within the housing of the termination assembly.

Figure 18:
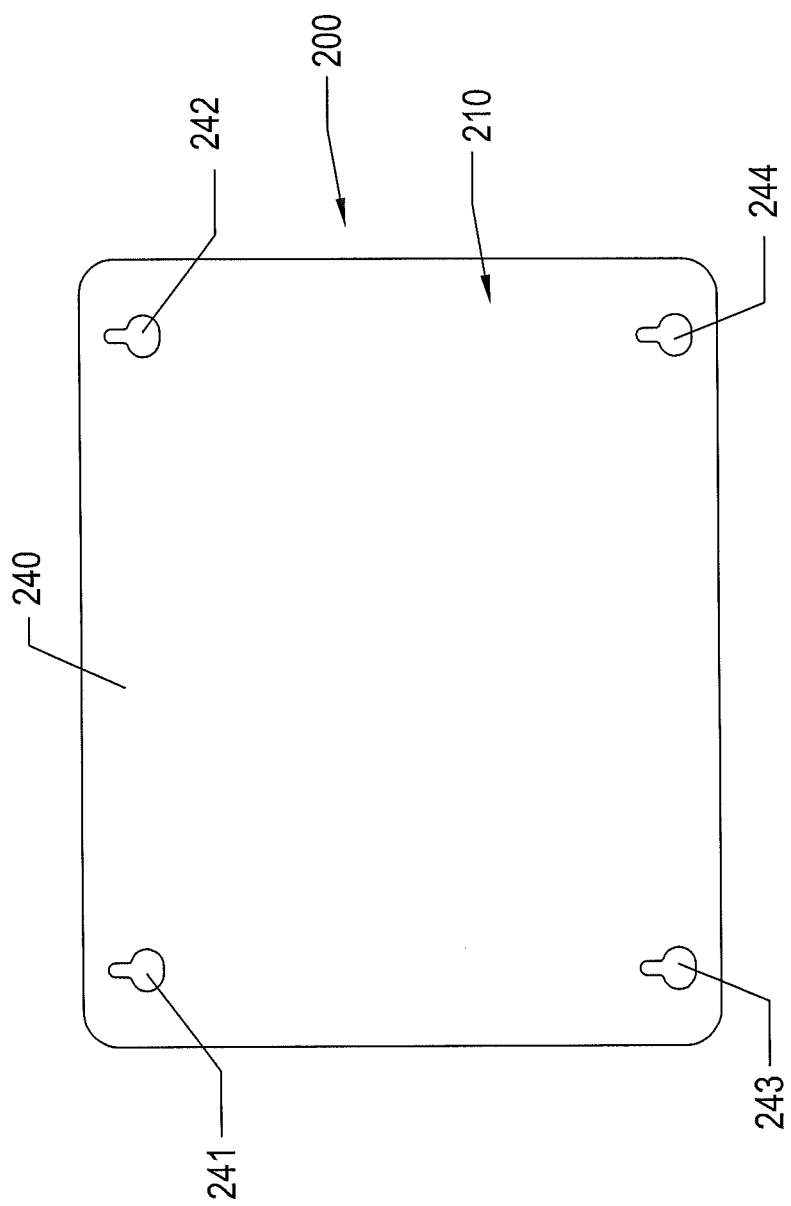
FIG. 18 is a plan view of an opposite side of the termination assembly of FIG. 12.

In some embodiments, the housing of a termination assembly may be installed on a support structure such as a vertical wall. The housing may be attached to the wall through the use of magnets or fasteners such as screws, nails, or hooks. For example, as shown in FIG. 18, a rear wall 240 of the housing 210 may include any or all of portions 241-244 capable of receiving a fastener that may be attached to a vertical wall. These portions may define a hole having a wider portion that receives the head of a screw or nail and a narrower portion into which the body of a fastener may be slid upon insertion of the head into any of the surfaces 241-244. Such portions may also receive hooks attached to the vertical wall. In other embodiments, at least one magnet may be attached to the vertical wall and magnets configured to oppose and matingly engage the magnet on the wall may be attached to the housing of a termination assembly such that the termination assembly may be removably fixed to the vertical wall.

In preparing a fixture such as that described previously herein, an optical fiber may be clamped onto a fixture in which a length of the fiber extends beyond an end of the fixture. In some embodiments, a portion of this extending length may be stripped from the end of the fiber. In some embodiments, a measurement guide, such as that described previously herein, may have markings designating a location to which to strip the fiber.

The fixture with the clamped fiber may then be placed against a base of a fiber cleaver, such as those commercially available, and then the fiber may be cleaved to form a new end. In some embodiments, the measurement guide may contact the base of the fiber cleaver and retract into a bore against a wall in the bore set at a predetermined distance from an end of the fixture. In this manner, when the measurement guide rests between the wall and the base of the fiber cleaver, the fiber may be cleaved to have a predetermined length. The markings on the measurement guide may then be used to inspect the overall length of the fiber extending from the fixture as well as the length of the stripped portion of the fiber.

In using a termination assembly such as that described previously herein, a first fixture may be engaged with an end of a housing of a termination assembly. The first fixture may support a portion of a first optical fiber and a support or splicer joint of the housing may support another portion of the first optical fiber including an end of the fiber. The support or splicer joint of the housing may further support a portion of a second fiber including an end of the second fiber. The first and second fibers may then be fixed in position at the support or splicer joint such that the ends of the first and second optical fibers are only in a predetermined alignment with each other, where the ends of the first and second optical fibers respectively are fixed at predetermined positions and predetermined orientations associated with the predetermined alignment. The first fixture, and optionally the second fixture, may then be removed with the first and second fibers remaining fixed in position at the support or splicer joint. In some embodiments, these fibers may be fixed in position at the support or splicer joint to be aligned at their centers.

In embodiments in which a fixture has a measurement guide, when such a fixture is inserted into the housing of the termination assembly, the measurement guide may extend into the housing. In some embodiments, the measurement guide may retract into a bore of such fixtures, in the manner described previously herein, when an end of the measurement guide rests against the support or splicer joint in the housing of the termination assembly. In further embodiments, the measurement guide may be positioned on an end of such a fixture such that upon extension of the measurement guide, the measurement guide does not contact the support or the splicer joint.

In some embodiments, another portion of the second fiber may additionally be supported by a second fixture that may be nearly identical to the first fixture. In other embodiments, the second optical fiber may be fixed to the support or splicer joint in a predetermined position such that no second fixture may be required. In some embodiments, either of the first or second fixtures may be removed from the housing once the fibers are fixed in position at the support. In some embodiments, a length of optical fiber may then be wound around a spooling mechanism within the housing, such as that described previously herein. In this manner, the optical fiber may be removed from the support or splicer joint, cleaved again, and then replaced at the support or splicer joint.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical fiber termination assembly comprising:
a housing having a first engagement element and a support adapted to support at least one optical fiber extending in a longitudinal direction; and
at least one locking mechanism attached to the housing and arranged to be operable to apply a bias towards the support such that, when an end of a second optical fiber is fixedly supported by the support extending in the longitudinal direction and an engagement component of a first fixture is engaged with the first engagement element of the assembly, a first optical fiber of the first fixture extends longitudinally therefrom towards the support and the locking mechanism is operable to be biased against the first optical fiber to maintain an end of the first optical fiber at the support fixed in a first position and only in a predetermined alignment with the end of the second optical fiber, wherein, upon placement of the first optical fiber on the support when the locking mechanism is not biased against the first optical fiber, the end of the first optical fiber is at a predetermined orientation and a predetermined position at the support associated with the predetermined alignment by engagement of the first engagement element with the engagement component,
wherein a portion of the support includes a first rigid portion and a first deformable portion for contacting the first optical fiber, and
wherein the locking mechanism includes a second rigid portion and a second deformable portion for contacting the first optical fiber, the first and second rigid portions being independent of each other, and the first and second deformable portions being independent of each other, the locking mechanism having open and closed positions, the closed position being operable to press against the first optical fiber, such that
when the locking mechanism is in the open position, each of the first and second deformable portions has a length and a second cross sectional area defined in directions transverse to the length along an inner section along the length, respectively, and a first cross sectional area defined in directions transverse to the length along outer sections along the rest of the length thereof, respectively, and each of the first and second rigid portions has a length and a first cross-sectional area defined in directions transverse to the length along an inner section along the length, respectively, and a second cross-sectional area defined in directions transverse to the length along outer sections along the rest of the length thereof, respectively, wherein the respective second cross sectional areas of the first and second deformable portions are less than the respective first cross sectional areas of the first and second deformable portions, and prior to contacting the first optical fiber each of the first and second deformable portions has a groove along the length for receiving the at least one optical fiber, and
when the locking mechanism is in the closed position, the first and second rigid portions form an axial bore having (i) a bore length, (ii) an inner portion having a cross-sectional area along the bore length, and (iii) outer portions along the rest of the bore length thereof, each of the outer portions having a larger cross-sectional area than the inner portion of the axial bore, the inner portion of the axial bore providing a greater force against the end of the first optical fiber than the outer portions thereof such that an inner region defined by the first and second deformable portions is compressed to a smaller cross-sectional area along the respective lengths thereof than outer regions of the first and second deformable portions along the rest of the respective lengths thereof.

2. The assembly of claim 1, wherein the first optical fiber is fixedly attached to the housing with the end thereof positioned at the support.

3. The assembly of claim 1, wherein the locking mechanism is operable to be biased against the first optical fiber to place the end of the first optical fiber fixed in position.

4. The assembly of claim 1, wherein at least the first fixture is a fixture for mounting optical fibers, the fixture comprising:
 a base for engaging the housing of the optical fiber termination assembly, the base having a surface for supporting the first optical fiber; and
 a clamping mechanism attached to the base such that, when the first optical fiber is supported by the base, the clamping mechanism is operable to be biased towards the base and against the first optical fiber to maintain a portion of the first optical fiber fixed in a predetermined fiber portion position at the base and a predetermined orientation with respect to the surface of the base,
 wherein, when the base is engaged with the housing, the end of the first optical fiber is configured to be positioned at the predetermined position and the predetermined orientation within the optical fiber termination assembly.

5. The fixture of claim 4, wherein the base includes an end having at least one prong extending therefrom or at least one surface defining a hole, the end being adapted to engage either at least one surface defining a hole or at least one prong of the optical fiber termination assembly corresponding to the end of the base.

6. The fixture of claim 4, wherein the base includes flanges that removably engage with the housing.

7. The assembly of claim 1, wherein the first fixture includes flanges that removably engage with the housing.

8. The assembly of claim 1, wherein an exterior of each of the first and second deformable portions defines a semicircular cross-sectional area in a direction transverse to and along the lengths of the respective first and second deformable portions.

* * * * *